(12) United States Patent
Aksyuk et al.

(10) Patent No.: US 8,139,283 B2
(45) Date of Patent: Mar. 20, 2012

(54) SURFACE PLASMON POLARITON MODULATION

(75) Inventors: Vladimir Anatolyevich Aksyuk, Westfield, NJ (US); Girsh Blumberg, New Providence, NJ (US)

(73) Assignee: Alcatel Lucent, Paris (FR)

( * ) Notice: Subject to any disclaimer, the term of this patent is extended or adjusted under 35 U.S.C. 154(b) by 577 days.

(21) Appl. No.: 11/983,538

(22) Filed: Nov. 9, 2007

(65) Prior Publication Data
US 2009/0122386 A1    May 14, 2009

(51) Int. Cl.
*G02B 26/00*    (2006.01)
(52) U.S. Cl. ............................................. 359/291
(58) Field of Classification Search .......... 359/290, 359/291, 292, 295, 298, 223, 224, 230, 320, 359/322, 324; 385/129, 130, 131
See application file for complete search history.

(56) References Cited

U.S. PATENT DOCUMENTS

| | | | |
|---|---|---|---|
| 6,724,056 B1 | 4/2004 | Blumberg et al. | 257/410 |
| 7,012,687 B2 | 3/2006 | Blumberg et al. | 356/301 |
| 7,027,689 B2 | 4/2006 | Blumberg et al. | 385/39 |
| 7,039,277 B2 | 5/2006 | Blumberg et al. | 385/39 |
| 7,039,315 B2 * | 5/2006 | Blumberg et al. | 398/49 |
| 7,054,528 B2 | 5/2006 | Blumberg | 385/43 |
| 7,068,409 B2 | 6/2006 | Aksyuk et al. | 359/224 |
| 7,111,504 B2 | 9/2006 | Blumberg et al. | 73/105 |
| 7,301,137 B2 | 11/2007 | Blumberg | 250/221 |
| 2004/0146246 A1 | 7/2004 | Blumberg et al. | 385/39 |
| 2007/0228869 A1 | 10/2007 | Aksyuk et al. | 310/309 |
| 2007/0279731 A1 | 12/2007 | Blumberg | 356/3 |

FOREIGN PATENT DOCUMENTS

| | | |
|---|---|---|
| EP | 0 992 833 A2 | 4/2000 |
| WO | WO 2004/023177 A2 | 3/2004 |

OTHER PUBLICATIONS

H. Raether, "Surface Plasmons on Smooth Surfaces and on Gratings", (Springer-Verlag, Berlin, Heidelberg, 1988), pp. 1-39, 91-117.
W. L. Barnes, et al, "Surface plasmon subwavelength optics", *Nature*, vol. 424, Aug. 14, 2003, pp. 824-830.
I.I. Smolyaninov, et al, "Magnifying Superlens in the Visible Frequency Range", available on-line at http://www.sciencemag.org/, *Science*, vol. 315, Mar. 23, 2007, pp. 1699-1701.
E. Egorov, et al, "Two-dimensional control of surface plasmons and directional beaming from arrays of subwavelength apertures", *Physical Review*, B70, (2004), pp. 033404-1 thru 033404-4.
V. A. Aksyuk, et al, "MEMS Spatial Light Modulator for Optical Maskless Lithography", *Solid-State Sensors, Actuators and Microsystems Workshop*, Mirror Tech 2006, pp. cover page, 11-14.
U.S. Appl. No. 11/514,584, filed Aug. 31, 2006, V. Aksyuk, et al.
U.S. Appl. No. 11/949,216, filed Dec. 3, 2007, V. Aksyuk, et al.

(Continued)

*Primary Examiner* — Ricky Mack
*Assistant Examiner* — Tuyen Q Tra
(74) *Attorney, Agent, or Firm* — John F. McCabe

(57) ABSTRACT

An apparatus includes a substrate having a metallic surface, a structure, and a dielectric object facing the metallic top surface. The structure is configured to optically produce surface plasmon polaritons that propagate on the metallic surface. The dielectric object is controllable to adjust values of the dielectric constant at an array of different positions along and near to the metallic surface.

19 Claims, 14 Drawing Sheets

OTHER PUBLICATIONS

U.S. Appl. No. 12/023,489, filed Jan. 31, 2008, G. Blumberg, et al.
U.S. Appl. No. 11/584,452, filed Oct. 20, 2006, G. Blumberg.
K.J. Chau, et al, et al, "A Gigahertz Surface Magneto-Plasmon Optical Modulator", *IEEE Journal of Quantum Electronics*, vol. 40., No. 5, May 1, 2004, pp. 571-579.
H. Ditlbacher, et al, "Two-dimensional optics with surface plasmon polaritons", *Applied Physics Letters*, vol. 81, No. 10, Sep. 2, 2002, pp. 1762-1764.
PCT International Search Report dated Feb. 20, 2009 (PCT/US2008/012213) 3 pages.

* cited by examiner

SURFACE PLASMON POLARITON MODULATION

BACKGROUND

1. Field of the Invention

The invention relates to devices based on surface plasmon polaritons and methods of operating such devices.

2. Discussion of the Related Art

This section introduces aspects that may help facilitate a better understanding of the inventions. Accordingly, the statements of this section are to be read in this light and are not to be understood as admissions about what is in the prior art or what is not in the prior art.

All-optical routers perform optical routing without performing intermediate conversions of received optical signals into electrical signals. Until recently, avoiding such conversions enabled all-optical routers to perform optical routing more rapidly than conventional non-all-optical routers in which received optical signals are converted to intermediate electrical signals. All-optical routers were typically simpler than such non-all-optical routers, because of the absence of hardware for performing such conversions. Indeed, a higher operating speed and a lower complexity often made such all-optical routers preferable to the non-all optical routers.

Recently, interest has increased in various types of non-all-optical routers. One type of non-all-optical router uses surface plasmon polaritons to perform optical routing. This type of non-all-optical router has a potential to both operate at high speeds and be simple and inexpensive to fabricate. In particular, the fabrication of such non-all-optical routers may be largely based on conventional techniques used in micro-electronics and integrated optical fabrication.

Surface plasma polaritons are also commonly referred to as surface plasmons. Surface plasmons are combinations of propagating surface charge densities and associated electromagnetic waves. Surface plasmons can propagate along the interface between a metal and a dielectric and can propagate along the surface of a metal exposed to vacuum. Surface plasmons can propagate along such interfaces and surfaces whether the surfaces are smooth or bumpy and whether the surfaces are flat or curved.

SUMMARY

The various embodiments provide apparatus and methods for modulating jets of surface plasmon polaritons (SPPs). Some embodiments provide for the focusing or defocusing of jets of SPPs. Some embodiments may be used to enhance strengths of the electro-magnetic fields associated with SPPs.

In a first aspect, the invention features an apparatus that includes a substrate having a metallic surface, a structure, and a dielectric object facing the metallic top surface. The structure is configured to optically produce SPPs that propagate on the metallic surface. The dielectric object is controllable to adjust values of the dielectric constant at an array of different positions along and near to the metallic surface.

In some embodiments of the apparatus, the dielectric object includes a dielectric layer facing the metallic surface and magnetic or electrical controllers positioned along the layer. Each controller is able to vary the dielectric constant of an adjacent portion of the dielectric layer.

In some embodiments of the apparatus, the structure includes a regular array of deformations along the metallic surface.

In some embodiments, the apparatus includes an array of MEMS actuators, and the dielectric object includes a flexible dielectric layer or an array of dielectric blocks. Each MEMS actuator is able to vary a distance from the metallic surface of a corresponding portion of the layer or of a corresponding one of the blocks. In some such embodiments, each portion of the dielectric layer or each of the dielectric blocks can be displaced to be next to the metallic surface. In some such embodiments, the apparatus includes a second substrate with a surface facing the metallic surface, and the MEMS actuators are located on the second substrate.

In some embodiments, the apparatus includes a second structure having a regular array of deformations along the metallic surface. The two structures are disjoint, and the second structure is configured to optically detect SPPs propagating to the second array.

In a second aspect, the invention features a method. The method includes producing a jet of SPPs on a metallic surface and spatially modulating wave fronts of the produced jet in a manner that changes a shape of the wave fronts. The modulating includes reducing a propagation velocity of a first part of each of the wave fronts with respect to a propagation velocity of second part of the each of the wave fronts.

In some embodiments, the modulating includes operating a plurality of MEMS actuators to move portions of a dielectric layer or dielectric blocks closer to or farther from the metallic top surface. Each portion of the dielectric layer or each dielectric block may have a width along the surface and along the wave fronts of less than 1/10 times a width of the wave fronts of the jet or of less than a wavelength of the SPPs of the jet. The operating may include causing distances of the portions of the dielectric layer or of the dielectric blocks from the metallic top surface to have a convex-up profile or a concave-up profile.

In some embodiments of the method, the spatially modulating includes laterally focusing the jet or causing the jet to diverge.

In some embodiments, the method further includes detecting light radiated by a portion of the spatially modulated wave fronts of the jet. The light is radiated from a regular array of deformations along the metallic top surface.

BRIEF DESCRIPTION OF THE FIGURES

In the Figures and text, similar reference numbers refer to features with substantially similar functions and/or substantially similar structures.

In some of the Figures, relative dimensions of features may be exaggerated to more clearly illustrate the structures shown therein.

Herein, various embodiments are described more fully by the Figures and the Detailed Description of Illustrative Embodiments. Nevertheless, the inventions may be embodied in various forms and are not limited to the specific embodiments that are described in the Figures and the Detailed Description of Illustrative Embodiments.

DETAILED DESCRIPTION OF ILLUSTRATIVE EMBODIMENTS

Figure 1:
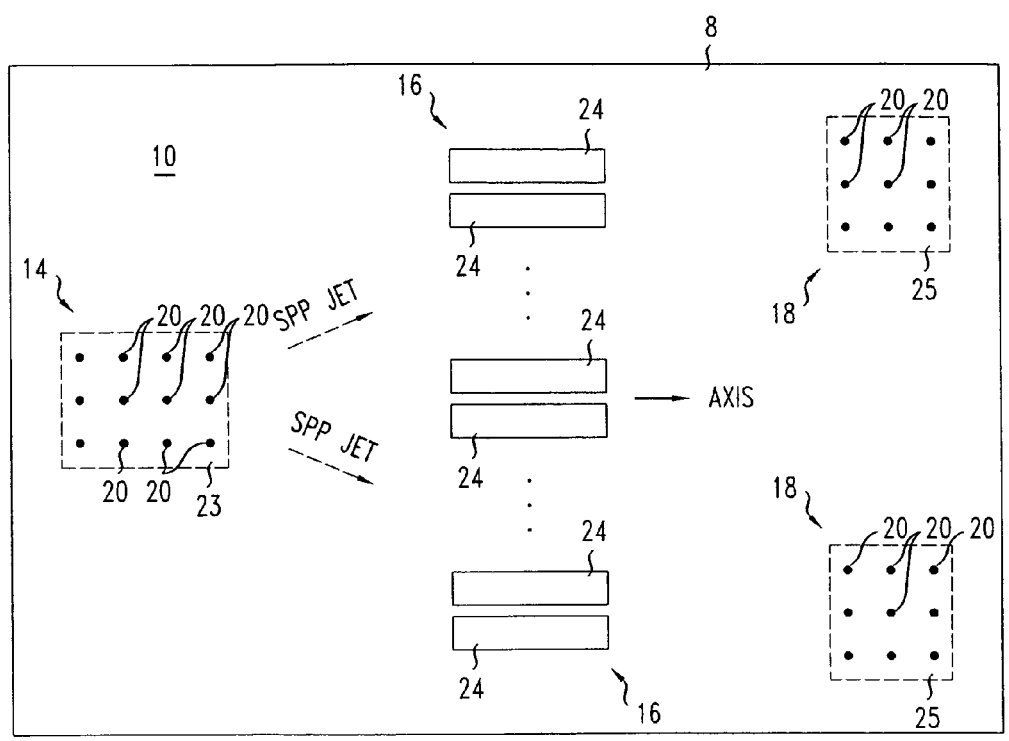
FIG. 1 is top view of a portion of an apparatus that produces and spatially modulates surface plasmon polaritons (SPPs)
Figure 2:
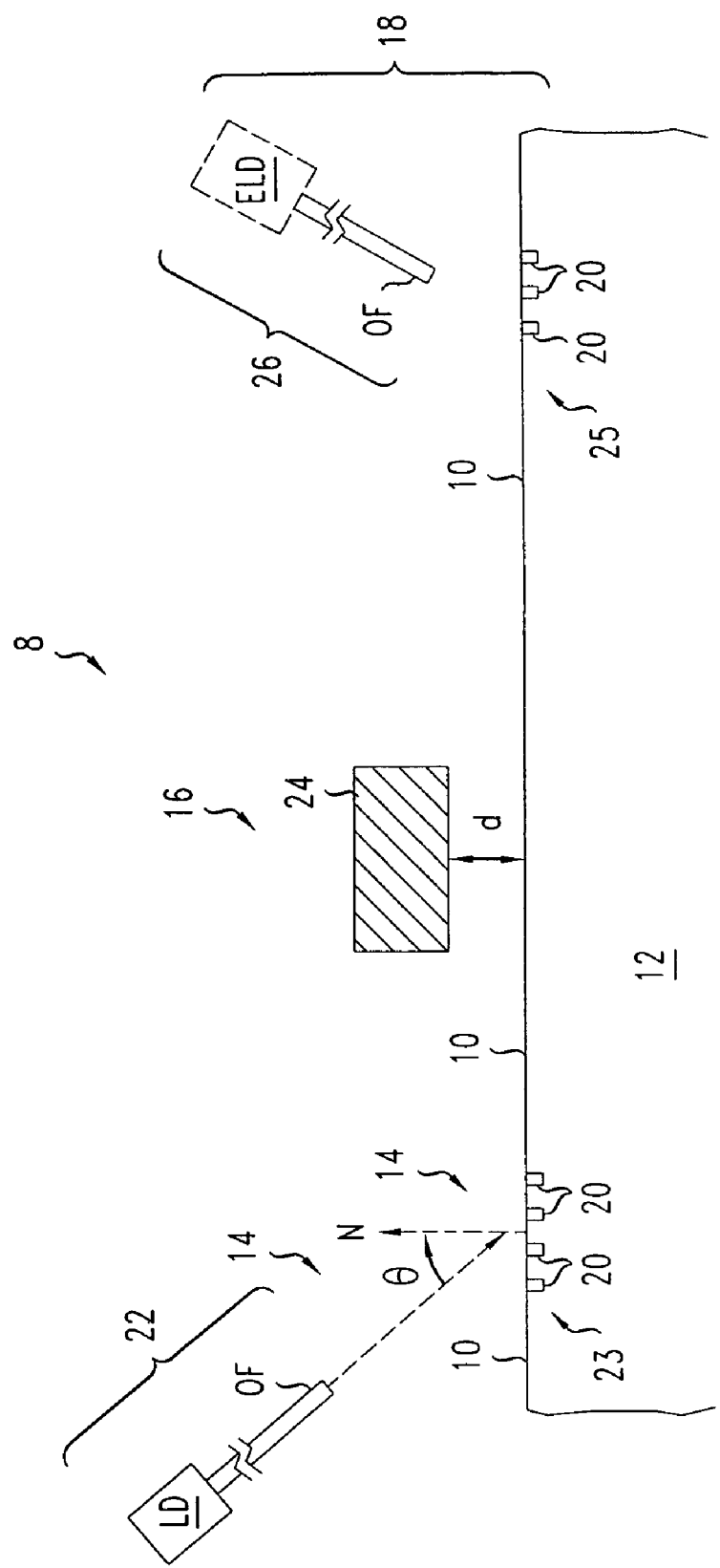
FIG. 2 is a side view of a portion of the apparatus of FIG. 1.

FIGS. 1 and 2 illustrate an apparatus 8 that is based on surface plasmon polaritons (SPPs). The SPPs propagate along a metallic top surface 10 of a substrate 12. The substrate 12 may include metal, dielectric, or semiconductor, and the top metallic surface may be planar. Exemplary of the substrate 12 are planar semiconductor substrates, which are suitable for micro-electronics fabrication, e.g., silicon wafer substrates. In such embodiments, the substrate 12 includes a top metal layer that produces the metal top surface 10. In various embodiments, the metal top surface 10 or metal substrate 12 may be formed of a variety of elemental or alloy metal, e.g., gold, silver, copper or aluminum. In some embodiments, the metallic top surface 10 may be covered by a thin transparent dielectric layer (not shown).

The apparatus 8 includes an optical SPP coupler 14, a spatial SPP modulator 16, and one or more SPP detectors 18. The metallic top surface 10 extends between the optical SPP coupler 14, the spatial SPP modulator 16, and the SPP detectors 18 so that SPPs can propagate between these elements. The optical SPP coupler 14, SPP modulator 16, and one or more SPP detectors 18 are positioned along disjoint lateral portions of the metallic top surface 10.

The optical SPP coupler 14 is configured to optically produce jets of SPPs that propagate on the metallic top surface 10. The optical SPP coupler 14 includes a light source 22 and a modified lateral region 23 (shown by a dashed box in FIG. 1) of the substrate 12. The light source 22 optically generates the SPPs in the modified lateral region 23 and may generate SPPs that propagate in different directions along the top surface of the metallic layer 12.

Herein, "jet of SPPs" refers to a propagating coherent mode of one or more surface plasmon polaritons. The jet's propagation defines a spatial sequence of constant phase wavefronts, which may be planar or arc-like or more complex in shape. Often, optical production produces a jet of SPPs that has a substantially well-defined propagation direction, but optical production may produce a jet of SPPs whose wavefronts are not straight. For example the optical SPP coupler 14 may produce a divergent or convergent jet of SPPs, i.e., with arc-like wavefronts, if the producing light beam has diverging or converging optical wavefronts.

In the illustrated optical SPP coupler 14, the modified lateral region 23 includes a substantially regular one-dimensional (1D) or two-dimensional (2D) array of deformations 20. The deformations 20 may be, e.g., holes in the metallic top surface 10, bumps on the metallic top surface 10, or holes in an optional transparent dielectric layer on the metallic top surface 10. The deformations 20 may have substantially the same shape and size and may be regularly spaced in the modified region.

In the illustrated optical SPP coupler 14, the light source 22 includes a laser diode, LD, coupled to an optical fiber, OF. One end of the optical fiber, OF, is configured to illuminate the modified lateral region 23 of the substrate 12 with light from the laser diode, LD. The light source 22 is configured to illuminate the regular 1D or 2D array of deformations 20 in a manner that generates SPPs, e.g., so that single photons generate single SPPs therein. For example, one end of the optical fiber, OF, may be oriented to project light onto the regular 1D or 2D array of deformations 20 at an oblique angle, θ, with respect to the normal vector, N, to the metal top surface 10.

Exemplary embodiments of suitable arrays of deformations 20 and light sources 22 for the optical SPP coupler 14 are described in U.S. Pat. No. 7,027,689, which is incorporated herein by reference in its entirety.

In alternate embodiments, the optical SPP coupler 14 may have different structures for optically generating SPPs. For example, the optical SPP coupler 14 may include a plasmon waveguide having a defect therein. Then, the light source 22 optically produces SPPs at the defect of the waveguide. The optical SPP coupler 14 may also include other periodic structures in the modified lateral region 23 of the metallic top surface 10, e.g., a crossed wire junction. Then, the light source 22 optically produces SPPs in the periodic structure. The optical SPP coupler 14 may also include a light source 22 that produces an evanescent light, wherein the evanescent light produces SPPs in the modified lateral region of the metallic top surface 10.

In some other embodiments, the metallic top surface 10 may be formed by a thin metal layer, wherein the deformations 20 are located along the bottom surface of the metal layer. Then, the light source 22 may generate SPPs that propagate on the metallic top surface 10 by illuminating the bottom surface of the thin metal layer.

The SPP modulator 16 includes a dielectric object with a bottom surface that faces and is adjacent to the metallic top surface 10. The dielectric object may include a 1D or 2D array of movable dielectric blocks 24 or alternately may include a flexible dielectric layer 24 (not shown in FIG. 1). In the former case, the dielectric blocks 24 are closely spaced so that the array forms a substantially complete covering of a strip of the metallic top surface 10. In the later case, a continuous flexible dielectric layer 24 replaces the dielectric blocks 24 so that gaps there between are eliminated. The dielectric blocks 24 or flexible dielectric layer 24 may have a bottom surface whose shape can complement of the shape of the adjacent portion of the metallic top surface 10. For example, adjacent portions of the metallic top surface 10 may be flat, and the bottom surfaces of such dielectric blocks 24 may be flat and substantially parallel to said adjacent portions. In various embodiments, the dielectric blocks 24 may have a variety of shapes, and different ones of the dielectric blocks 24 may have different shapes, e.g., as illustrated in FIG. 1.

The dielectric blocks 24 or flexible dielectric layer 24 may be thicker and longer than the wavelength of SPPs produced by the optical SPP coupler 14, e.g., two or more times such wavelengths.

The dielectric blocks 24 or flexible continuous dielectric layer 24 may have a variety of different material compositions. Exemplary material compositions include ordinary dielectrics such as silica ($SiO_2$) and/or silicon nitride ($Si_3N_4$). Other exemplary compositions may include ferroelectrics or polarizable compound semiconductors. The compositions may be lithium niobate ($LiNbO_3$), barium titanate ($BaTiO_3$), lead titanate ($PbTiO_3$), potassium niobate ($KNbO_3$), lead cobalt tungstate ($Pb(Co_{1/2}W_{1/2})O_3$), lead iron tantalate ($Pb(Fe_{1/2}Ta_{1/2})O_3$), lead magnesium niobate ($Pb(Mg_{1/3}Nb_{2/3})O_3$), lead zinc niobate ($Pb(Zn_{1/3}Nb_{2/3})O_3$), lithium tantalate ($LiTaO_3$) potassium strontium niobate, sodium strontium niobate ($NaSr_2Nb_5O_{15}$), lithium potassium strontium niobate ($LiNaSr_4Nb_{10}O_{30}$), sodium barium niobate ($NaBa_2Ni_5O_{15}$), barium strontium niobate, potassium lithium niobate ($K_3Li_2Nb_5O_{15}$), bismuth titanate ($Bi_4Ti_3O_{12}$), or potassium dihydrogen phosphate ($KH_2PO_4$). The compositions may also be crystalline group III-V or group II-VI semiconductors with the formulas $Al_xGa_{(1-x)}N$, $ZnO$, $Mg_xZn_{(1-x)}O$, $Cd_xZn_{(1-x)}O$ with $0 \leq x1$. The dielectric blocks 24 or flexible dielectric layer 24 may also include mixtures and/or multilayers of the above-described compositions.

In embodiments with an array of dielectric blocks 24, the positions of the individual dielectric blocks 24 are MEMS-controlled. In particular, each dielectric block 24 may be independently moved away from the metallic top surface 10 and towards the metallic top surface 10 by a corresponding MEMS actuator. For example, the dielectric blocks 24 may be positioned so that their bottom surfaces contact the metallic top surface 10 and so that their bottom surfaces are far from the metallic top surface 10 compared to wavelengths of SPPs produced by the SPP source 14. The positions of the individual dielectric blocks 24 determine local values of the effective dielectric constant for SPPs as discussed below.

In embodiments with a flexible dielectric layer 24, the shape of the dielectric layer 24 is MEMS-controlled. In particular, the shape of the flexible dielectric layer 24 may be deformed by individual MEMS actuators spread in a 1D or 2D array over the back surface of the flexible dielectric layer 24. Then each MEMS actuator can move a corresponding region of the flexible dielectric layer 24 away from the metallic top surface 10 and/or towards the metallic top surface 10. For example, regions of the dielectric layer 24 may be positioned so that their bottom surfaces contact the metallic top surface 10 or so that their bottom surfaces are far from the metallic top surface 10 compared to wavelengths of SPPs produced by the SPP source 14. The positions of the different regions of the flexible dielectric layer 24 determine the values of the effective dielectric constant for SPPs as discussed below.

The one or more SPP detectors 18 are configured to optically detect SPPs propagating on the metallic top surface 10. Each SPP detector 18 includes a conventional light detector 26 and a modified lateral region of the substrate 12.

In the illustrated SPP detectors 18, the modified lateral region 25 includes a substantially regular 1D or 2D array deformations 20 (shown by dashed boxes in FIG. 1) at the metallic top surface 10. The deformations 20 may be, e.g., holes in or bumps on the metallic top surface 10 or holes in an optional transparent dielectric layer on the metallic top surface 10. The deformations 20 may have about same size and shape and may be uniformly distributed in the modified lateral region 25 of the metallic top surface 10.

In the illustrated SPP detectors 18, each light detector 26 includes an optical fiber, OF, and an electronic light detector, ELD. One end of the optical fiber, OF, is configured to receive light radiated from the modified lateral region 25 of the substrate 12. The electronic light detector ELD senses light emitted by the other end of the optical fiber, OF, e.g., via a diode detector.

Exemplary embodiments of suitable SPP detectors 18 are described in U.S. Pat. No. 7,027,689, which is incorporated herein by reference in its entirety.

In alternate embodiments, the SPP detectors 18 may include different types of light detectors 26. For example, the modified lateral regions may include other types of periodic deformations of the metallic top surface 10. Also, the SPP detectors 18 may be light-sensitive diodes or transistors located on or near the metallic top surface 10.

Figure 3:
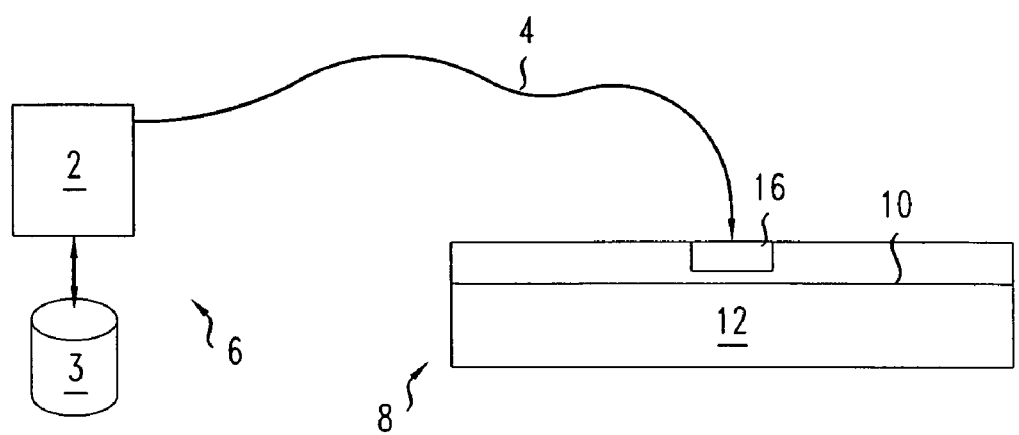
FIG. 3 is a block diagram illustrating the apparatus of FIGS. 1-2 an exemplary control system for the apparatus.

FIG. 3 illustrates a control system 6 for the apparatus 8 of FIGS. 1-2. The control system 6 includes a digital data processor 2, e.g., a computer; a digital data storage device 3, e.g., a digital data memory; and an electrical control line 4. The digital data processor 2 controls the SPP modulator 16 via electrical control signals delivered via the control line 4. The control signals control a spatial array of elements of the SPP modulator 16 that determine the values of the effective dielectric constant at positions along and near the top metal surface 10. In some embodiments, the digital data processor 2 controls vertical positions of dielectric blocks 24 or disjoint spatial regions of a flexible dielectric layer 24 above the top metal surface 10 as shown in FIGS. 1-2. In other embodiments, the digital data processor 2 controls the lateral spatial polarization profile in a dielectric layer located on the top surface 10, wherein the local polarization fixes the dielectric constant near the top metal surface 10. The digital data memory 3 may store an executable program for operating the digital data processor 2 to control the SPP modulator 16 and/or may include data for enabling the digital data processor 2 to operate the SPP modulator 16 to generate a set of different spatial profiles of the effective dielectric constant above and near to the top metal surface 10.

Referring again to FIGS. 1 and 2, many types of actuators can be used to provide the vertical motion of the dielectric blocks 24 or alternately of disjoint regions of the flexible dielectric layer 24. For example, various conventional types of micro-machined actuators can be fabricated together with the dielectric blocks or regions of the flexible dielectric layer 24 or attached to the dielectric blocks 24 or distributed along the flexible dielectric layer 24 to provide vertical displacements thereof responsive to external control signals, e.g., electrical or optical signals. Exemplary actuators can use electrostatic, magnetic, piezoelectric, thermal expansion or methods for imparting the displacements to the dielectric blocks 24 or alternately to disjoint regions of the flexible dielectric layer 24.

A variety of conventional micro-machining and micro-fabrication processes can be used to fabricate such actuators. The conventional processes may include layer material depositions, surface and bulk micro-machining, bonding, electroplating, layer patterning, layer and/or deep etching and/or techniques related to the use of sacrificial layers.

Micro-fabricated electrostatic actuators are particularly suited for fabricating dense arrays of dielectric blocks 24 that are controlled by micro-actuators due to availability of good conductive and elastic materials for micro-fabrication. These materials include, e.g., doped single crystal silicon, polycrystalline silicon, compatible conventional dielectrics, and various metals. These materials can also produce small actuators in which power dissipation is low.

Figure 4:
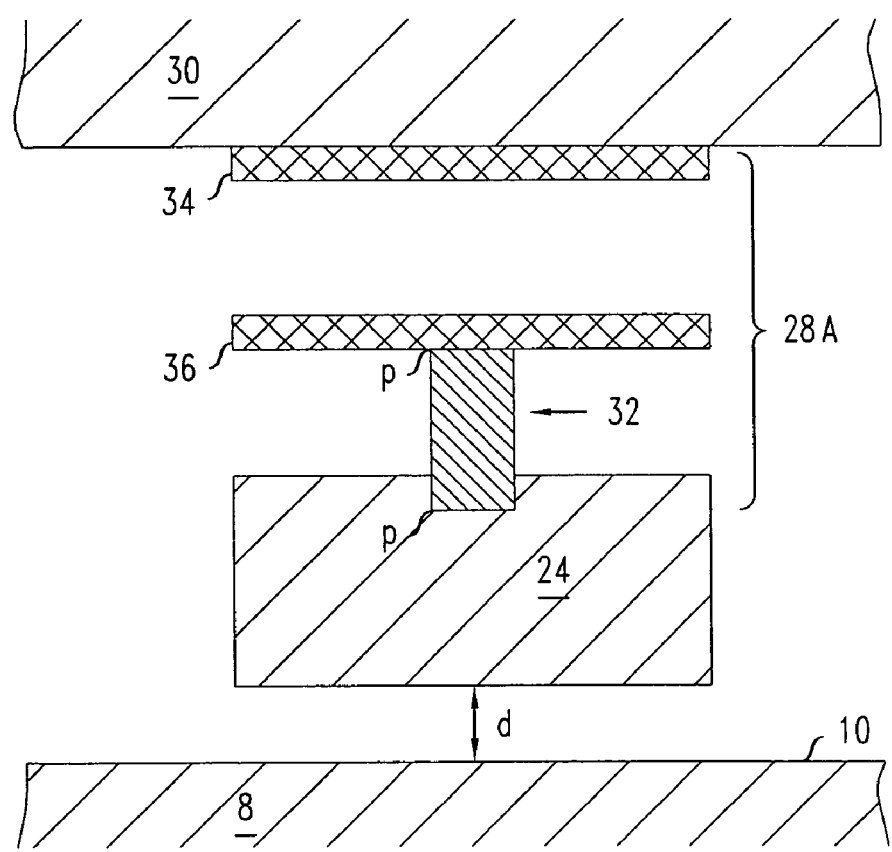
FIG. 4 is a side view one MEMS actuator of a first embodiment of a spatial modulator for jets of SPPs, e.g., for use in the apparatus of FIG. 1-2.
Figure 5:
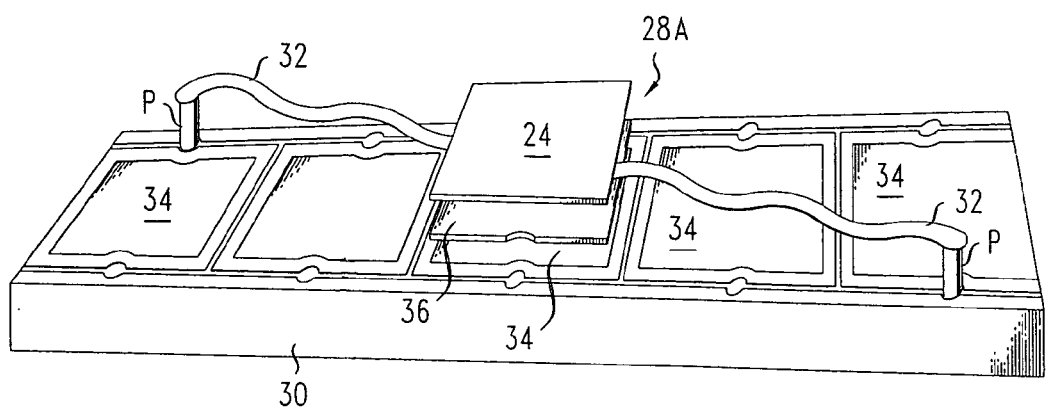
FIG. 5 is an oblique view further illustrating the portion of the spatial modulator of FIG. 4.

FIGS. 4 and 5 illustrate one embodiment of such an electrostatic mechanical actuator for the dielectric blocks 24 of FIGS. 1 and 2 or alternately for regions of the flexible dielectric layer 24 of FIG. 2. In this embodiment, each dielectric block 24 or region of the flexible dielectric layer 24 is mechanically displaced by a corresponding micro-electro-mechanical system (MEMS) actuator 28A. The MEMS actuators 28A are rigidly attached to a surface of a second substrate 30 that faces the metallic top surface 10 of the first substrate 12.

In such an embodiment, the apparatus 8 is a multiple wafer-substrate structure. The first wafer substrate 12 includes the modified regions of the optical SPP coupler 14 and the SPP detector(s) 18 and the metallic top surface 10. The second wafer substrate 30 includes the MEMS actuators 28A and the dielectric blocks 24 or the flexible dielectric sheet 24. The first and second substrates 30, 12 are aligned and bonded together to form a vertical stack. In the vertical stack, spacer regions (not shown) maintain facing surfaces of the substrates 30, 12 at a fixed separation distance. Such multiple wafer-substrate structures can be fabricated by conventional micro-electronics fabrication techniques known to those of skill in the art.

Each MEMS actuator 28A includes a restoring spring 32 and a control capacitor having a fixed electrode 34 and a movable electrode 36. The movable electrode 36 is rigidly attached to the corresponding dielectric block 24 or alternately to the corresponding region of the flexible dielectric layer 24 via metal, dielectric or semiconductor post(s), P, that are integral with the restoring spring 32. The ends of the restoring springs 32 rigidly fix to the second substrate 30 via posts, P, and may pass between other dielectric blocks 24 and corresponding movable electrodes 36. For that reason, the individual MEMS actuators 28A and, e.g., the dielectric blocks 24 may densely cover a contiguous strip-like region or a wider region. That is, the MEMS actuators 28A can be distributed to form a closely packed 1D array or a closely packed 2D array.

Each movable electrode 36 can be displaced relative to the fixed electrode 34 of the same control capacitor by applying a control voltage across the electrodes 34, 36. The resulting motion of the movable electrode 36 can vary the distance, d, between the bottom surface of the corresponding dielectric block 24 or alternately of the corresponding region of the flexible dielectric layer 24 and the nearby metallic top surface 10 of the first substrate 12. That is, the MEMS control voltages can be used to independently position the dielectric blocks 24 or regions of the flexible dielectric layer 24 in the spatial SPP modulator 16 with respect to the adjacent metallic top surface 10.

FIGS. 6-7 and 8-9 schematically illustrate two other geometries for electrostatic MEMS actuators 28B, 28C that are suitable for controlling positions pf the individual dielectric blocks 24 or alternately individual regions of the dielectric layer, e.g., as shown in FIGS. 1-2. The MEMS actuators 28B, 28C move the associated dielectric blocks 24 or regions of the flexible dielectric layer 24 toward the metal surface 10 in response to the application of a voltage across their control capacitors. In contrast, the MEMS actuator 28A of FIGS. 4-5 moves the associated dielectric block 24 regions of the flexible dielectric layer 24 away from the metal surface 10 in response to the application of such a voltage across it control capacitor, e.g., application of a voltage across the electrodes 34, 36.

Figure 6:
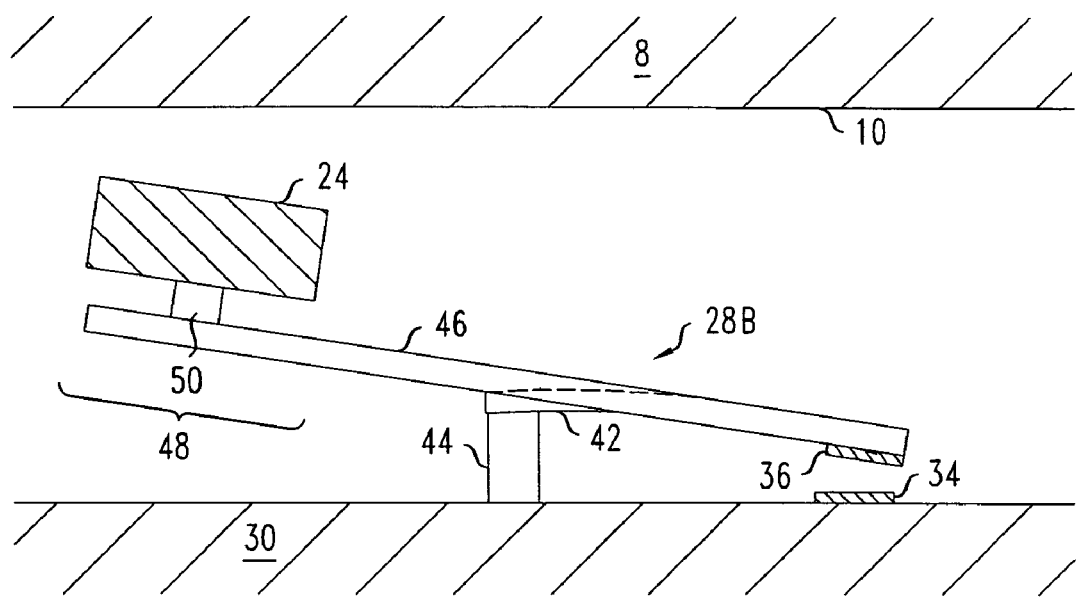
FIG. 6 is a side view one MEMS actuator of a second embodiment of a spatial modulator jets of SPPs, e.g., for use in the apparatus of FIGS. 1-2.
Figure 7:
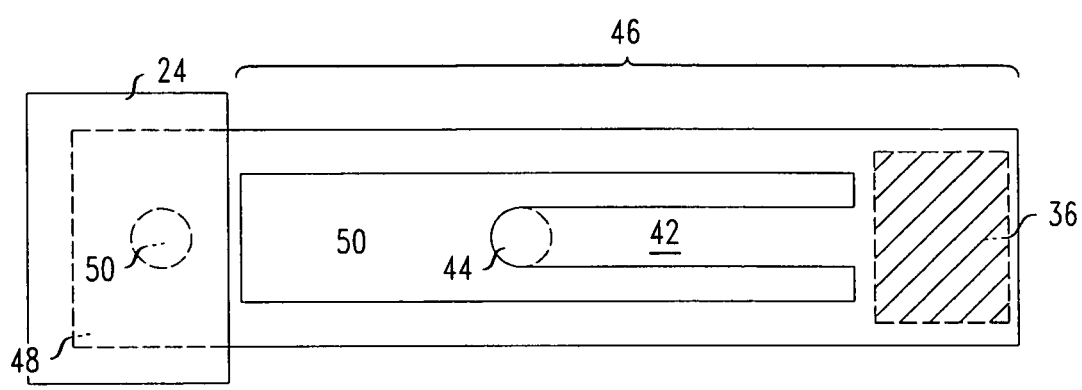
FIG. 7 is a top view of the moving portion of the MEMS actuator of FIG. 6.

Referring to FIGS. 6-7, the MEMS actuator 28B includes fixed electrode 34, movable electrode 36, flexible spring arm 42, a support post 44, a lever arm 46, an attachment plate 48, and an attachment post 50 that rigidly and directly connects to the corresponding dielectric block 24 or region of the flexible dielectric layer 24. In the MEMS actuator 28B, a control voltage across the electrodes 34, 36 causes the adjacent end of the flexible spring arm 42 to bend towards the substrate 30. This motion causes the tip of the lever arm 46 to move in the opposite direction so that the dielectric block 24 or region of the flexible dielectric layer 24 is moved closer to the top metal surface 10.

Figure 8:
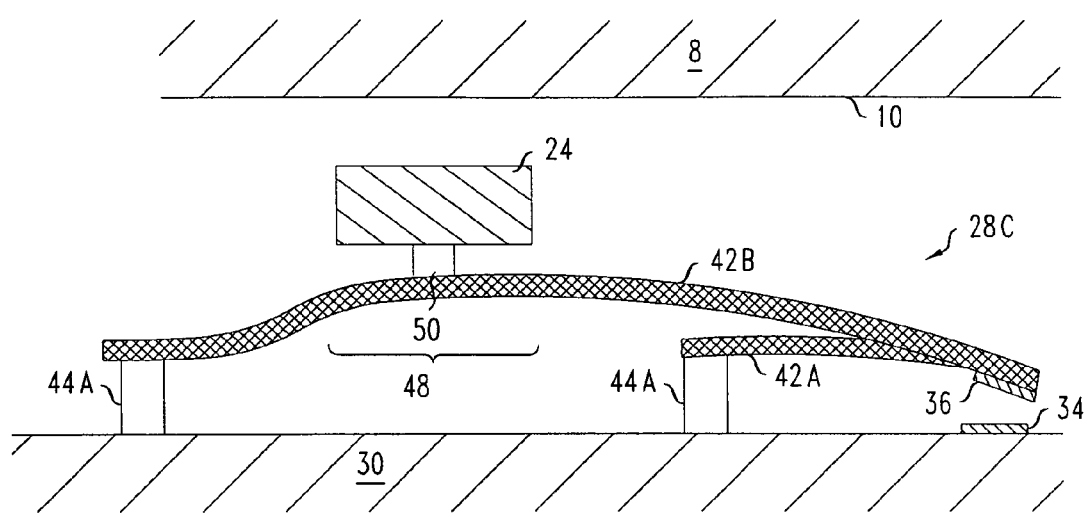
FIG. 8 is a side view one MEMS actuator of a third embodiment of a spatial modulator for jets of SPPs, e.g., for use in the apparatus of FIGS. 1-2.
Figure 9:
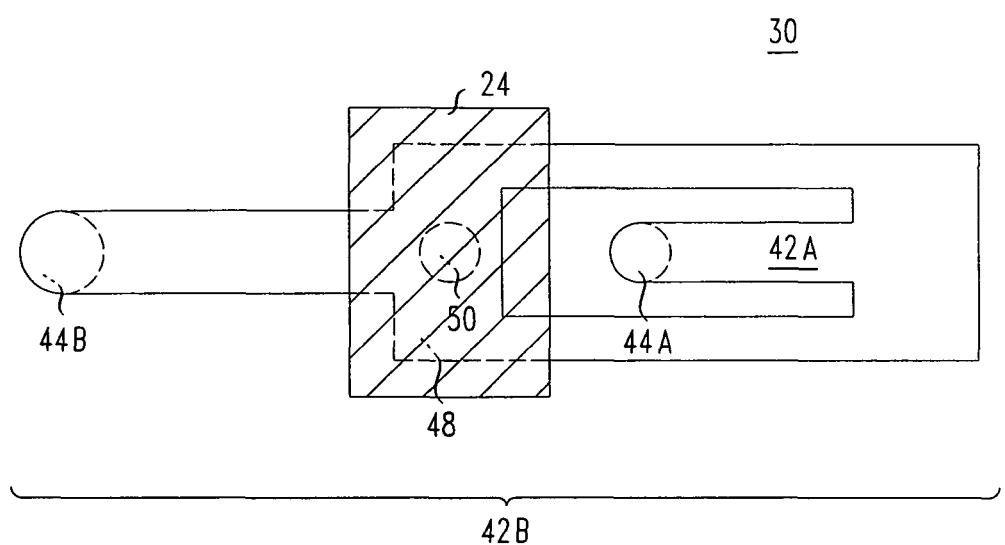
FIG. 9 is a top view of the moving portion of the MEMS actuator of FIG. 8.

The small tilt of the dielectric block 24 or alternately of a region of the flexible dielectric layer 24 during such a motion can be eliminated by adding a compensating spring that attaches between the attachment plate 48 and a second post on the substrate 30, e.g., as shown in the MEMS actuator 28C of FIGS. 8-9.

Referring to FIGS. 8-9, the MEMS actuator 28C includes fixed electrode 34, movable electrode 36, flexible spring arms 42A-42B, support posts 44A-44B, an attachment plate 48, and an attachment post 50 that connects to the corresponding dielectric block 24 or alternately to the corresponding region of the dielectric layer 24. In the MEMS actuator 28C, a control voltage across the electrodes 34, 36 causes the adjacent ends of the flexible spring arms 42A, 42B to bend towards the substrate 30. This motion cause the central portion of the spring arm 42B to move in the opposite direction so that the dielectric block 24 or the region of the dielectric layer 24 is moved closer to the top metal surface 10.

Referring to FIGS. 4-9, the various MEMS actuators 28A-28C can be fabricated to be sufficiently narrow so that a dense linear array of such actuators may be constructed.

Exemplary MEMS actuators suitable for the MEMS actuator 28 and methods of making such actuators are described, e.g., in U.S. Pat. No. 7,068,409; U.S. patent application Ser. No. 11/394,950, filed Mar. 31, 2006, by Carl J. Nuzman et al, and U.S. patent application Ser. No. 11/514,584, filed Aug. 31, 2006, by Vladimir Aksyuk et al. The above U.S. patent and patent applications are incorporated herein in their entirety.

Instead of using the displacement of regions of a dielectric layer or of the dielectric blocks of an array, the SPP modulator 16 of FIG. 1 may alternately be based on a controllable dielectric layer whose dielectric constant responds to the application of an electric or magnetic field. For example, the controllable layer may be lithium niobate or another polarizable material. The controllable dielectric layer 24 is, e.g., located on an area of the top metallic surface 10. The polarization and related value of the dielectric constant in different regions of the controllable dielectric layer will depend on values of the electric or magnetic fields that nearby voltage-based or magnetic-based control structures, e.g., electrodes, produce in said regions.

In the embodiments of FIGS. 1-3 and FIGS. 4-9, the vertical placement of the dielectric blocks 24 or alternately of the various regions of the flexible dielectric layer 24 determine the velocity (e.g., the phase velocity) of SPPs in the spatial SPP modulator 16. In particular, an SPP typically has a wave vector, k, whose magnitude, k, relates to the SPP's frequency, ω, through a dispersion relation:

$$k = (\omega/c) \cdot ([\in_m(\omega) \cdot \in_d(\omega)] / [\in_m(\omega) + \in_d(\omega)])^{1/2}.$$

Thus, the magnitude, k, of the wave vector, k, depends on both the effective dielectric constant, $\in_d(\omega)$, of the dielectric region and the dielectric constant, $\in_m(\omega)$, of the metal along the path of the SPP. In each lateral region, the value of the effective dielectric constant, $\in_d(\omega)$, above and near the metallic top surface 10 affects the wave vector magnitude, k, and thus, affects the phase velocity of SPPs in the region.

Similarly, in embodiments where the SPP modulator 16 includes a polarizable dielectric layer on the top metallic surface 10, the magnitude of the wave vector, k, of an SPP depends on values, $\in_d(\omega)$, of the dielectric constant in regions of the layer over and near the top metal surface along which the SPP propagates.

Figure 10:
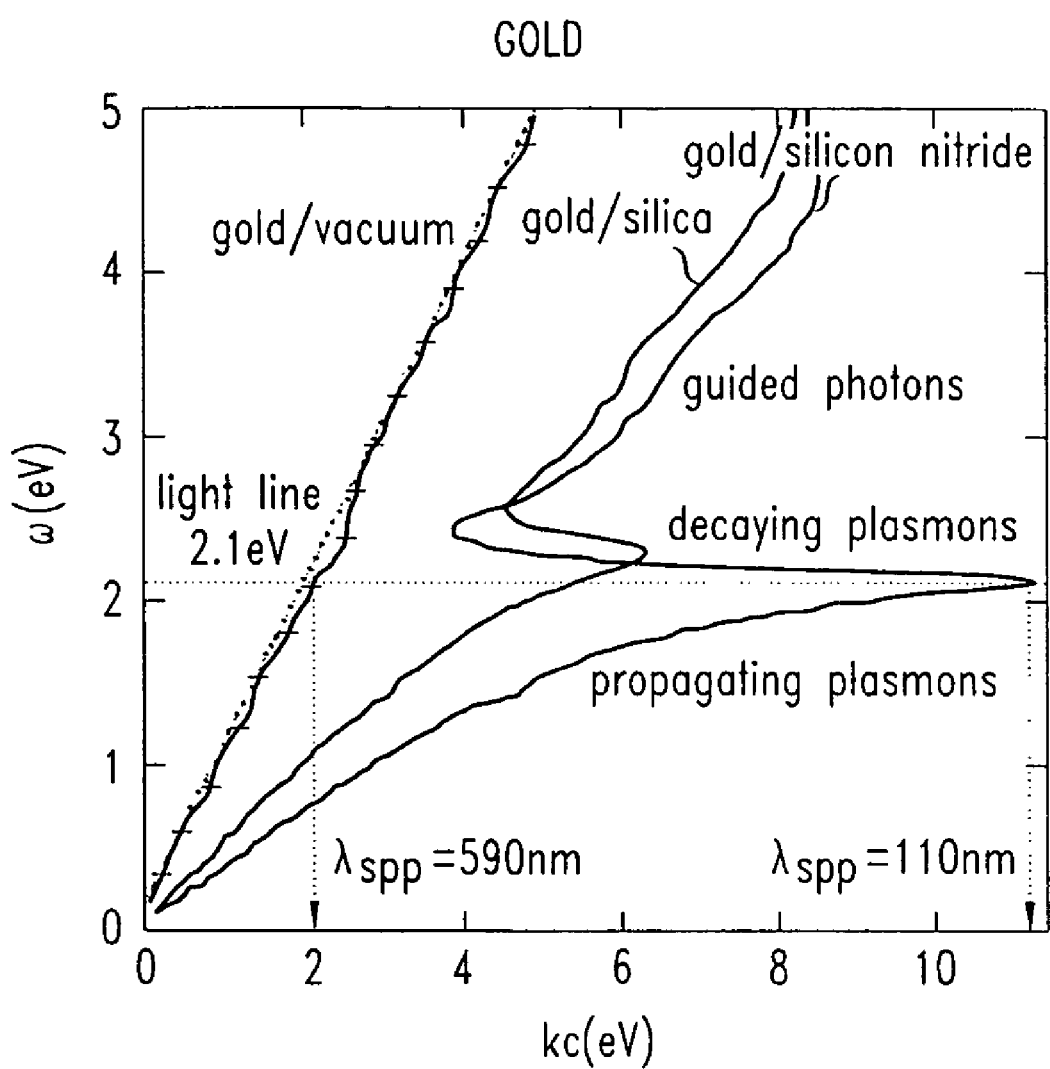
FIG. 10 plots dispersion relations of SPPs at gold-vacuum and various gold-dielectric interfaces.
Figure 11:
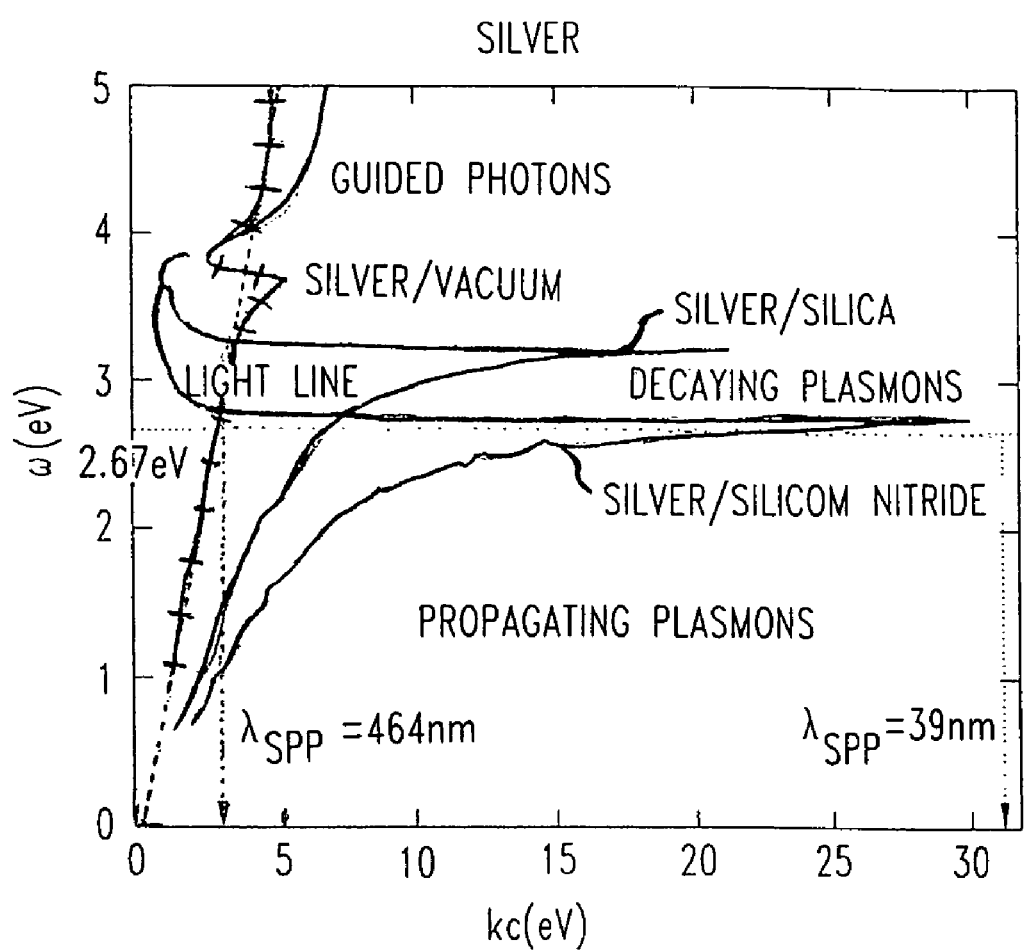
FIG. 11 plots dispersion relations of SPPs at silver-vacuum and various silver-dielectric interfaces.

FIGS. 10 and 11 illustrate that the dispersion relations of SPPs vary with the values of the effective dielectric constants of the dielectric and metal, i.e., $\in_d(\omega)$ and $\in_m(\omega)$, at the interface along which the SPPs propagate.

FIG. 10 shows dispersion relations of various types of SPPs at gold surfaces. In particular, the graphs show dispersion relations of SSPs at a gold/vacuum interface (crossed-gray line), a gold/silica interface (black line), and a gold/silicon nitride interface (gray line). The dispersion relation for light, i.e., dotted line, is shown for comparison purposes. From the different SPP dispersion lines in the "propagating plasmon" region, it is clear that propagating SPPs of the same frequency, i.e., ω, would have wave vectors of different magnitude, $k_C$.

FIG. 11 shows dispersion relations of various types of SPPs at silver surfaces. In particular, the graphs show dispersion relations of SSPs at a silver/vacuum interface (crossed-gray line), a silver/silica interface (black line), and a silver/silicon nitride interface (gray line). The dispersion relation for light, i.e., dotted line, is shown for comparison purposes. From the different SPP dispersion lines in the "propagating plasmon" region, it is again clear that propagating SPPs of the same frequency, i.e., ω, would have wave vectors of different magnitude, $k_C$.

FIGS. 10 and 11 provide indications that the values of the effective dielectric constant on the dielectric side of a metal-dielectric interface will affect the phase velocity of SPPs along the metal-dielectric interface.

In FIGS. 1-3, the spatial SPP modulator 16 modulates local velocities of SPPs through the local values of the effective dielectric constant, $\in_d(\omega)$, in the region above and near to the metallic top surface 10. The spatial SPP modulator 16, e.g., moves one or more of the dielectric blocks 24 or regions of a dielectric layer 24 nearer to and/or farther from the metallic top surface 10, e.g., using MEMS actuators 28A-28C of FIGS. 4-9, to locally change the values of the effective dielectric constant, $\in_d(\omega)$, i.e., as seen by nearby SPPs. For example, moving a dielectric block 24 or alternately a region of a flexible dielectric layer 24 nearer to (farther from) the metallic top surface 10 typically increases (decreases) the value of the effective dielectric constant, $\in_d(\omega)$. Due to the dependence of SPP velocities on the effective dielectric constant, $\in_d(\omega)$, the SPPs of a jet will have local velocities that depend on the positions of the nearby dielectric blocks 24 or alternately on the positions of nearby regions of the dielectric layer 24.

Through the distances, d, of the individual dielectric blocks 24 or alternately of individual regions of a flexible dielectric layer 24 from the metallic top surface 10, as illustrated in FIGS. 2 and 4-9, the spatial SPP modulator 16 controls local velocities of SPPs. For that reason, the spatial SPP modulator and ultimately the control system 6 of FIG. 2 can control shapes of wave fronts in jets of SPPs. For example, the 1D array of dielectric blocks 24 or regions of the flexible dielectric layer 24 may be configured to modify the wave fronts of a jet of SPPs in a manner similar to how a converging lens, a diverging lens, or a mirror or prism modifies the wave fronts of a light beam. In a configuration for a converging SPP lens, the control system 6 sets the spatial SPP modulator 16 so that the distances, d, between the top metal surface 10 and the bottoms of the dielectric blocks 24 or alternately of the disjoint regions of the flexible dielectric layer 24 qualitatively have one of the distance profiles plotted in FIGS. 12 and 13. In a configuration for a diverging SPP lens, the control system 6 sets the spatial SPP modulator 16 so that the distances, d, between the top metal surface 10 and the bottoms of the dielectric blocks 24 or alternately of the disjoint regions of the flexible dielectric layer 24 qualitatively have the other of the distance profiles plotted in FIGS. 12 and 13. That is, one of the convex-up distance profile and the concave-up distance profile produces a converging SPP lens and the other of these two distance profiles produces a diverging SPP lens. The specific correspondence between the SPP focusing-type and the profile type for distances, d, e.g., convex-up or concave-up, may be found from the above-described SPP dispersion relation.

Figure 14:
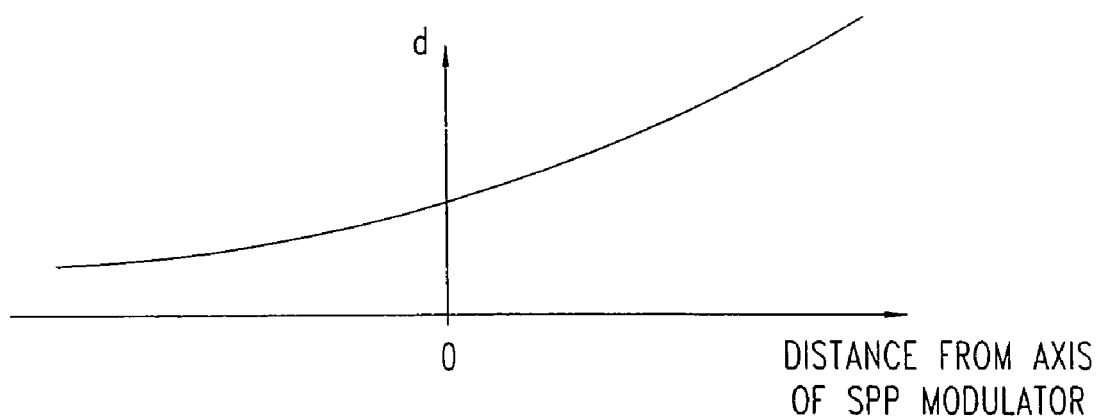
FIG. 14 shows an exemplary slanted spatial profile for distances from the metallic top surface to lateral regions of the dielectric layer or to the dielectric blocks in the spatial SPP modulator of FIGS. 1-3.

In a configuration for an SPP mirror or prism, the control system 6 sets the SPP modulator 16 so that the distances, d, between the top metal surface 10 and the bottoms of the dielectric blocks 24, or alternately of the disjoint regions of the flexible dielectric layer 24, qualitatively have a distance profile as plotted in FIG. 14. That is, a slanted line profile, i.e., slanting down to the right or to the left, can be used to turn an incident jet of SPPs to the left or right with respect to the incident propagation direction along the metal surface 10. The value of the turning angle depends on the orientation of the slanted line defining the profile and can be determined from the SPP dispersion relation.

Other configurations of the SPP modulator 16 may, e.g., combine the slanted profile with one or more of the convex-up profile and the concave-up profile to simultaneously redirect and refocus an incident jet of SPPs.

Furthermore, in some embodiments, the control system 6 of the spatial SPP modulator 16 may be able to move the dielectric blocks 24 or alternately regions of the dielectric layer 24 from one configuration to another. For example, the control system 6 may be able to cause the spatial SPP modulator 16 to function as either a converging SPP lens or a diverging SPP lens by adjusting the distance profile to that of FIG. 12 or that of FIG. 13. For that reason, such embodiments of the SPP modulator 16 may be operated to switch between focusing and defocusing an incident jet of SPPs provided that lateral dimensions of the dielectric blocks 24 or regions of the dielectric layer 24 therein are small compared to the width of the incident jet of SPPs along the metallic top surface 10. In such embodiments, the dielectric blocks 24 typically may have lateral dimensions that are small compared to the width along the metallic top surface 10 of the SPP jets produced by the optical SPP coupler 14, e.g., a width of less than the wavelengths of the SPPs in the jet. Indeed, this lateral dimension of the dielectric blocks 24 may be 5 micrometers or less, 2 micrometers or less, 1 micrometer or less, or even 0.5 micrometers or less.

In some embodiments, control system 6 may produce yet other spatial profiles of the effective dielectric constant above and near the top metal surface 10. The control system 6 may even approximately spatially modulate both the phase and the amplitude of wavefronts of a jet of SPPs by operating disjoint groups of the adjacent elements of the SPP modulator 16, e.g., disjoint groups of adjacent dielectric blocks 24, as local operating units (LOUs). Then, the lateral parts of a wavefront processed by the elements of one LOU interfere to produce a local amplitude and phase modulation of that part of the wavefront. Such LOUs could be operated similarly to the manner in which LOUs of mirrors were operated in the reconfigurable mirror arrays described in U.S. patent application Ser. No. 11/448,390, filed Jun. 6, 2006, by Girsh Blumberg. This U.S. patent application is incorporated herein by reference in its entirety.

Figure 15:
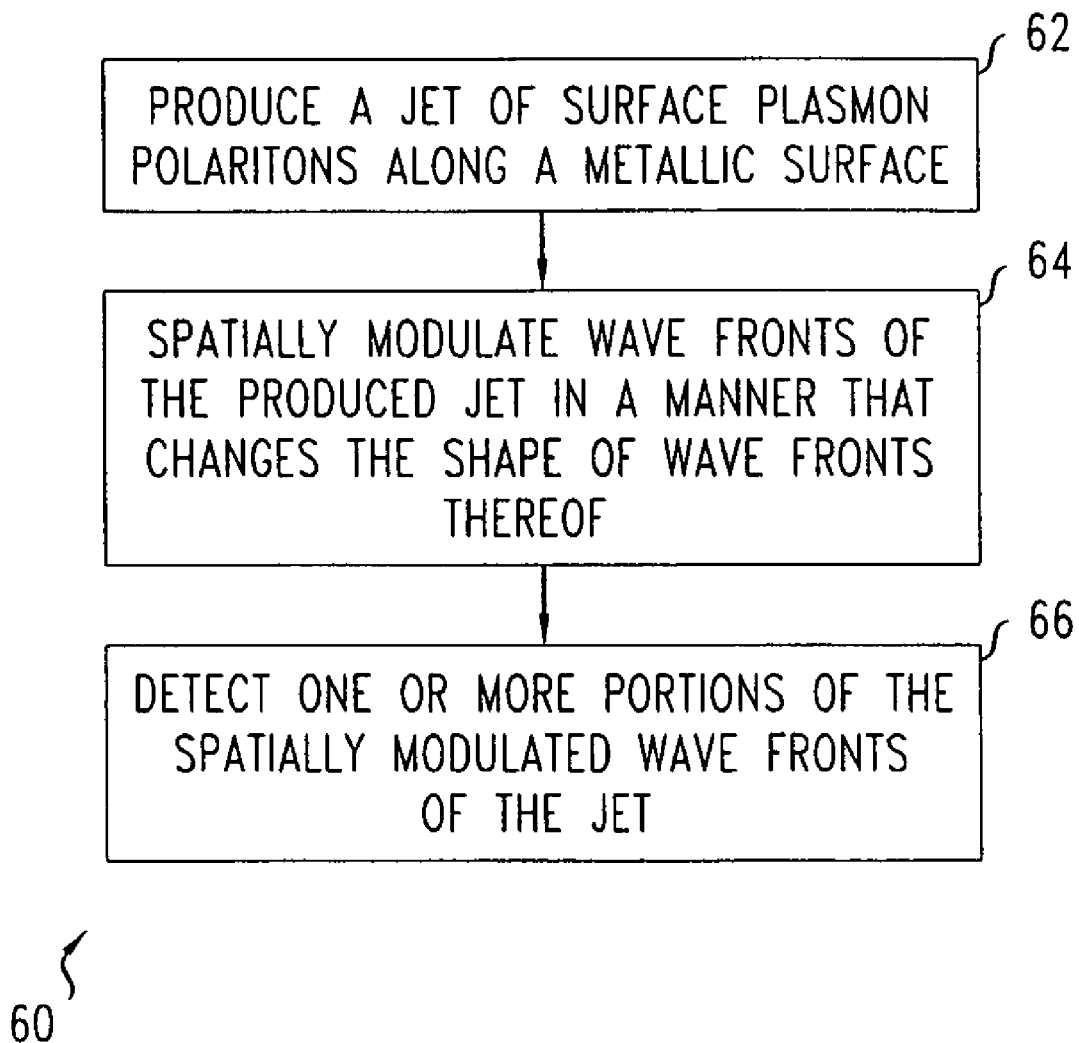
FIG. 15 is a flow chart schematically illustrating one method for spatially modulating surface plasmons, e.g., with the apparatus of FIGS. 1-3 and, e.g., the MEMS actuators of FIGS. 4-9.

FIG. 15 illustrates a method 60 that uses jets of SPPs, e.g., to operate the apparatus 8 of FIGS. 1 and 2 with the control system 6 of FIG. 3.

The method 60 includes producing a SPP jet along a metallic top surface (step 62). For example, the SPP jet may be optically produced by the optical SPP coupler 14 on the metallic top surface 10 as illustrated in FIGS. 1-2.

The method 60 includes spatially modulating wave fronts of the produced SPP jet in a manner that changes the shapes of wave fronts (step 64). The spatially modulating step 62 involves relatively decreasing phase or propagation velocities of some portions of each wave front of the SPP jet with respect to the phase or propagation velocities of other portions of the same wave front. For example, such relative velocity differences may be produced by positioning the bottom surfaces of different ones of the dielectric blocks 24 or alternately of different regions of the flexible dielectric layer 24 of the spatial SPP modulator 16 of FIGS. 1-3 at different distances from the metallic top surface 10.

Figure 12:
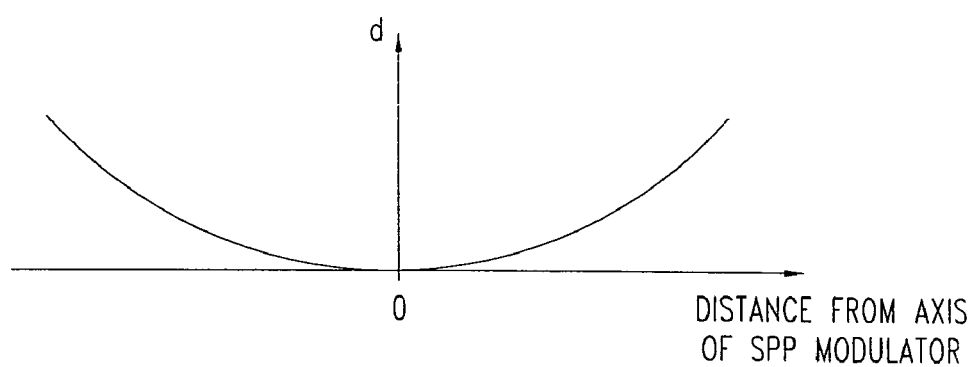
FIG. 12 shows an exemplary concave-up spatial profile for distances from the metallic top surface to lateral regions of the dielectric layer or to the dielectric blocks in the spatial SPP modulator of FIGS. 1-3.
Figure 13:
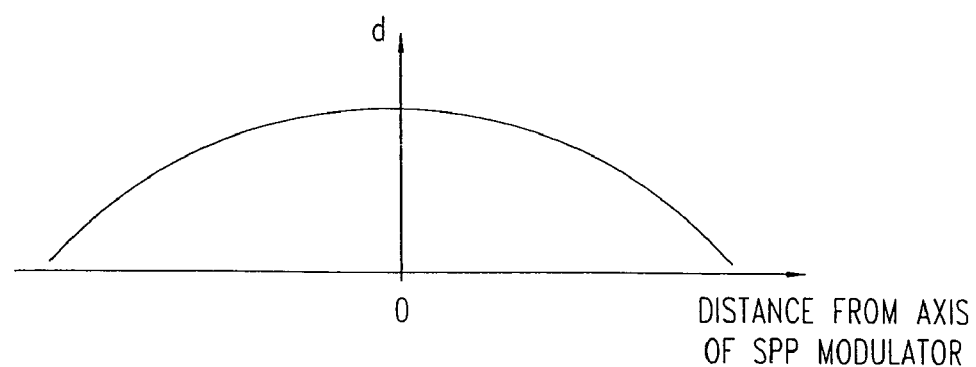
FIG. 13 shows an exemplary convex-up spatial profile for distances from the metallic top surface to lateral regions of the dielectric layer or to the dielectric blocks in the spatial SPP modulator of FIGS. 1-3.

In some embodiments, the step 64 involves positioning the dielectric blocks 24 or alternately of different regions of the flexible dielectric layer 24 to produce a spatial profile for distances, d, with a concave-up form, e.g., as in FIG. 12, a convex-up form, e.g., as in FIG. 13, or a profile of another shape. The form of the resulting profile may focus the SPP jet or defocus the SPP jet. Indeed, some embodiments may produce such focusing to increase the intensity of the electromagnetic fields associated with the SPP jet.

In other embodiments, the step 64 involves positioning the dielectric blocks 24 or regions of the flexible dielectric layer 24 to cause an effective reflection of the SPP jet at a surface.

The method 60 includes detecting one or more portions of the spatially modulated wave fronts of the SPP jet that is produced at step 64 (step 66). The detecting step may include detecting light that is radiated from said one or more portions of the spatially modulated wave fronts in the SPP detector(s) 18 of FIGS. 1-2. The light may be radiated from a modified lateral region 25 of the metallic top surface 10, wherein the modified lateral region includes a regular array or deformations 20, e.g., as shown in FIGS. 1-2.

In some embodiments, the method 60 includes repeating steps 64 and 66, e.g., for a different spatial profile for the distances, d, of the individual dielectric blocks 24 or alternately of the individual regions of the flexible dielectric layer 24 from the metallic top surface 10. In such embodiments, the dielectric blocks 24 or the regions of the flexible dielectric layer 24 may be positioned by MEMS actuators, e.g., by the MEMS actuators 28A-28C of FIGS. 4-9.

The invention is intended to include other embodiments that would be obvious to one of skill in the art in light of the description, figures, and claims.

What we claim is:

1. An apparatus, comprising:
a substrate having a metallic surface;
a structure to optically produce surface plasmon polaritons that propagate in different directions on the metallic surface; and
a dielectric object having a surface facing the metallic surface, the dielectric object being controllable to adjust values of the dielectric constant at an array of different positions along and near to the metallic surface to change a spatial profile of the dielectric constant laterally along a wavefront of the surface plasmon polaritons; and
wherein the structure includes a regular array of deformations along the metallic surface.

2. The apparatus of claim 1, wherein the dielectric object includes a dielectric layer facing the metallic surface and magnetic or electrical controllers positioned along the layer, each controller being able to vary the dielectric constant of an adjacent portion of the dielectric layer to change the spatial profile.

3. An apparatus, comprising:
a substrate having a metallic surface;
a structure to optically produce surface plasmon polaritons that propagate in different directions on the metallic surface;
a dielectric object having a surface facing the metallic surface, the dielectric object being controllable to adjust values of the dielectric constant at an array of different positions along and near to the metallic surface; and
an array of MEMS actuators; and
wherein the dielectric object comprises a flexible dielectric layer or an array of dielectric blocks, each MEMS actuator being able to vary a distance from the metallic surface of a corresponding portion of the layer or a corresponding one of the blocks.

4. The apparatus of claim 3, wherein each portion of the dielectric layer or each of the dielectric blocks can be displaced to be next to the metallic surface.

5. The apparatus of claim 3, wherein the dielectric object can be operated to adjust values of an effective dielectric constant at a plurality of positions along a wavefront of a jet of surface plasmon polaritons produced by the structure.

6. The apparatus of claim 5, further comprising a second substrate with a surface facing the metallic surface, the MEMS actuators being located on the second substrate.

7. The apparatus of claim 3, further comprising:
a second substrate having a surface facing the metallic surface; and
wherein the MEMS actuators are located on the second substrate.

8. An apparatus, comprising:
a substrate having a metallic surface;
a structure to optically produce surface plasmon polaritons that propagate on the metallic surface;
a dielectric object having a surface facing the metallic surface, the dielectric object being controllable to adjust values of the dielectric constant at an array of different positions along and near to the metallic surface; and
an array of MEMS actuators; and
wherein the dielectric object includes an array of dielectric blocks, each MEMS actuator being able to vary a distance from the metallic surface of a corresponding one of the dielectric blocks.

9. The apparatus of claim 8,
further comprising a second substrate having a surface facing the metallic surface; and
wherein the MEMS actuators are located on the second substrate.

10. The apparatus of claim 9, wherein each dielectric block is a block having a surface facing and substantially parallel to the metallic surface.

11. An apparatus, comprising:
a substrate having a metallic surface;
a first structure to optically produce surface plasmon polaritons that propagate in different directions on the metallic surface;
a dielectric object having a surface facing the metallic surface, the dielectric object being controllable to adjust values of the dielectric constant at an array of different positions along and near to the metallic surface to change a spatial profile of the dielectric constant laterally along a wavefront of the surface plasmon polaritons; and a second structure having a regular array of deformations along the metallic surface, the two structures being disjoint, the second structure being configured to optically detect surface plasmon polaritons propagating to the regular array.

12. A method, comprising producing a jet of surface plasmon polaritons on a metallic surface;

spatially modulating wave fronts of the produced jet in a manner that changes a shape of the wave fronts; and wherein the modulating includes reducing a propagation velocity of a first part of each of the wave fronts with respect to a propagation velocity of a second part of the each of the wave fronts; and wherein the modulating comprises operating a plurality of MEMS actuators to move portions of a dielectric layer or dielectric blocks closer to or farther from the metallic surface.

13. The method of claim 12, wherein each portion of the dielectric layer or each dielectric block has a width along the surface and along the wave fronts of the jet, the width being less than $1/10$ times a width of the wave fronts of the jet.

14. The method of claim 12, wherein the operating comprises moving the portions of the dielectric layer or the dielectric blocks, each of the portions of the dielectric layer or of the dielectric blocks having a width along the surface and the wave fronts, the width being less than a wavelength of the surface plasmon polaritons of the jet.

15. The method of claim 12, wherein the operating causes distances of the dielectric layer or the dielectric blocks from the metallic surface to have a convex-up profile or a concave-up profile.

16. The method of claim 12, wherein the spatially modulating includes laterally focusing or defocusing the jet.

17. The method of claim 12, wherein the spatially modulating includes causing the jet to change direction.

18. The method of claim 12, detecting light radiated by a portion of the spatially modulated wave fronts of the jet, the light being radiated from a regular array of deformations along the metallic surface.

19. The method of claim 12, wherein the spatially modulating includes effectively spatially modulating the amplitude of the jet.

* * * * *